United States Patent
Shi et al.

(10) Patent No.: US 11,427,059 B2
(45) Date of Patent: Aug. 30, 2022

(54) SOFT TONNEAU COVER WITH SUPPORTING CROSS BAR

(71) Applicants: Hang Shi, Changzhou (CN); Hongjuan Zheng, Changzhou (CN)

(72) Inventors: Hang Shi, Changzhou (CN); Hongjuan Zheng, Changzhou (CN)

(73) Assignees: Hang Shi, Changzhou (CN); Hongian Zheng, Changzhou (CN)

( * ) Notice: Subject to any disclaimer, the term of this patent is extended or adjusted under 35 U.S.C. 154(b) by 0 days.

(21) Appl. No.: 16/371,512

(22) Filed: Apr. 1, 2019

(65) Prior Publication Data
US 2020/0039337 A1     Feb. 6, 2020

Related U.S. Application Data

(66) Substitute for application No. 62/733,767, filed on Sep. 20, 2018, now abandoned.

(30) Foreign Application Priority Data

Aug. 2, 2018    (CN) .......................... 201821239044.X

(51) Int. Cl.
| | |
|---|---|
| *B60J 7/00* | (2006.01) |
| *B60J 7/10* | (2006.01) |
| *B60R 5/04* | (2006.01) |
| *B60P 7/04* | (2006.01) |

(52) U.S. Cl.
CPC ................. *B60J 7/104* (2013.01); *B60P 7/04* (2013.01); *B60R 5/047* (2013.01)

(58) Field of Classification Search
CPC ............. A45C 2011/002; A45C 11/00; A45C 2011/003; B60J 7/1291; B60J 7/102; B60J 7/198; B60J 7/141; B60J 7/202; H04B 1/3888; B60P 7/02
See application file for complete search history.

(56) References Cited

U.S. PATENT DOCUMENTS

| | | | | |
|---|---|---|---|---|
| 5,121,960 A | * | 6/1992 | Wheatley | B60P 7/04 160/368.1 |
| 5,207,262 A | * | 5/1993 | Rushford | B60J 7/102 160/354 |
| 5,522,635 A | * | 6/1996 | Downey | B60J 7/102 160/368.1 |
| 5,553,652 A | * | 9/1996 | Rushford | B60J 7/102 160/354 |
| 5,655,807 A | * | 8/1997 | Rosario | B60J 7/102 296/100.12 |
| 5,758,922 A | * | 6/1998 | Wheatley | B60J 7/102 160/368.1 |

(Continued)

*Primary Examiner* — Kiran B Patel
(74) *Attorney, Agent, or Firm* — Bayramoglu Law Offices LLC

(57) ABSTRACT

In accordance with embodiments of the present disclosure, a tonneau cover for covering a pickup truck's cargo bed may include a frame structure for attaching to walls of the cargo bed. The tonneau cover may include a soft cover for covering the cargo bed, wherein the soft cover has edges that can be attached to the frame structure, and a cross bar attached to an inner side of the soft cover. When the soft cover is in a closed position, two ends of the cross bar are supported by the frame structure, and at least a portion of the soft cover is supported by the cross bar.

22 Claims, 6 Drawing Sheets

(56) References Cited

U.S. PATENT DOCUMENTS

| | | | | |
|---|---|---|---|---|
| 5,772,273 A * | 6/1998 | Wheatley | B60J 7/104 | 160/368.1 |
| 5,934,735 A * | 8/1999 | Wheatley | B60J 7/102 | 296/100.01 |
| 6,024,401 A * | 2/2000 | Wheatley | B60J 7/102 | 296/100.17 |
| 6,126,226 A * | 10/2000 | Wheatley | B60J 7/10 | 296/100.01 |
| 6,234,561 B1 * | 5/2001 | Huotari | B60J 7/10 | 296/100.15 |
| 6,619,719 B1 * | 9/2003 | Wheatley | B60J 7/085 | 296/100.12 |
| 6,719,353 B1 * | 4/2004 | Isler | B60J 7/102 | 296/100.16 |
| 7,008,000 B1 * | 3/2006 | Schmeichel | B60J 7/085 | 296/100.16 |
| 7,048,277 B1 * | 5/2006 | Schmeichel | B60J 7/102 | 296/100.11 |
| 7,815,239 B1 * | 10/2010 | Schmeichel | B60J 11/00 | 296/136.01 |
| 8,544,934 B2 * | 10/2013 | Maimin | B60J 7/085 | 296/100.12 |
| 8,857,887 B1 * | 10/2014 | Schmeichel | B60P 7/04 | 296/100.18 |
| 9,914,344 B1 * | 3/2018 | Stull | B60J 7/1204 | |
| 9,924,765 B1 * | 3/2018 | Coronel | A44B 18/0069 | |
| 10,239,394 B2 * | 3/2019 | Lutzka | B60J 7/141 | |
| 2002/0180235 A1 * | 12/2002 | Wheatley | B60J 7/102 | 296/100.16 |
| 2003/0057726 A1 * | 3/2003 | Wheatley | B60J 7/102 | 296/100.18 |
| 2004/0108746 A1 * | 6/2004 | Elliott | B60J 7/104 | 296/100.16 |
| 2004/0119314 A1 * | 6/2004 | Haack | B60J 7/102 | 296/100.18 |
| 2006/0255615 A1 * | 11/2006 | Malmberg | B60J 7/102 | 296/100.16 |
| 2006/0255616 A1 * | 11/2006 | Malmberg | B60J 7/102 | 296/100.16 |
| 2007/0108792 A1 * | 5/2007 | Weldy | B60J 7/198 | 296/100.09 |
| 2007/0205629 A1 * | 9/2007 | Wheatley | B60J 7/062 | 296/100.18 |
| 2010/0133872 A1 * | 6/2010 | Kosinski | B60J 7/104 | 296/100.09 |
| 2011/0169296 A1 * | 7/2011 | Schrader | B60J 7/104 | 296/100.15 |
| 2013/0093206 A1 * | 4/2013 | Rusher | B60P 7/02 | 296/100.14 |
| 2013/0114997 A1 * | 5/2013 | Yue | B60J 7/102 | 403/205 |
| 2013/0341960 A1 * | 12/2013 | Garska | B23P 11/00 | 296/100.18 |
| 2016/0039274 A1 * | 2/2016 | Smith | B60P 7/02 | 296/100.02 |
| 2016/0075220 A1 * | 3/2016 | Williamson | B60J 7/104 | 296/98 |
| 2016/0263974 A1 * | 9/2016 | Xu | B60J 7/067 | |
| 2016/0280123 A1 * | 9/2016 | Rohr | B60J 7/067 | |
| 2016/0304024 A1 * | 10/2016 | Beltowski | B60J 7/12 | |
| 2017/0120736 A1 * | 5/2017 | Lutzka | B60J 7/141 | |
| 2018/0118002 A1 * | 5/2018 | Koengeter | B60J 7/196 | |
| 2018/0126833 A1 * | 5/2018 | Hannan | B60J 7/068 | |
| 2018/0194208 A1 * | 7/2018 | Binfet | B60J 7/104 | |
| 2018/0281572 A1 * | 10/2018 | Zichettello | B60J 7/198 | |
| 2018/0281573 A1 * | 10/2018 | Zichettello | B60J 7/104 | |
| 2018/0281574 A1 * | 10/2018 | Zichettello | B60J 7/104 | |
| 2018/0281576 A1 * | 10/2018 | Zichettello | B60J 10/26 | |
| 2019/0009657 A1 * | 1/2019 | Carter | B60J 7/141 | |
| 2019/0092149 A1 * | 3/2019 | Facchinello | B60J 7/141 | |
| 2019/0118629 A1 * | 4/2019 | Spencer | B60J 7/198 | |
| 2019/0308494 A1 * | 10/2019 | Aubrey | B60P 7/06 | |
| 2019/0322220 A1 * | 10/2019 | Linn | B60R 5/041 | |
| 2020/0031210 A1 * | 1/2020 | Aimaq | B60J 7/0015 | |
| 2020/0062094 A1 * | 2/2020 | Xu | B60J 7/104 | |
| 2020/0086808 A1 * | 3/2020 | Linn | B60R 11/06 | |
| 2020/0101823 A1 * | 4/2020 | Bernardo | B60J 7/068 | |
| 2020/0130483 A1 * | 4/2020 | Vickery | B60J 7/041 | |
| 2020/0130487 A1 * | 4/2020 | Dylewski, II | B60J 7/141 | |

* cited by examiner

SOFT TONNEAU COVER WITH SUPPORTING CROSS BAR

CROSS REFERENCE TO RELATED APPLICATION

The present application is related to and claims the benefit of priority of the following commonly-owned applications: a U.S. provisional application Ser. No. 62/733,767, filed Sep. 20, 2018, entitled "A Soft Tonneau Cover Fixated with Supporting Cross Bar", of which the present application is a non-provisional application thereof; and a Chinese Patent Application No. 201821239044.X, filed Aug. 2, 2018, entitled "A Soft Tonneau Cover for Pick-up Truck." The disclosures of the forgoing applications are hereby incorporated by reference in it entirely, including any appendices or attachments thereof, for all purposes.

BACKGROUND

Unless otherwise indicated herein, the approaches described in this section are not prior art to the claims in this application and are not admitted to be prior art by inclusion in this section.

Cargo bed covers (or tonneau covers) have been used to cover the cargo beds of pickup trucks and protect cargo bed interior against dirt, debris and other environmental contaminants. In some cases, cargo bed covers are also used to improve the aesthetic quality of the pickup trucks. Conventional covers include hard-covers and soft-covers. The hard-covers often contain multiple rigid panels hinged together. The soft-covers are typically made of fabrics or canvas. The hard-covers are usually harder to open and close, while the soft-covers are lighter and more convenient to operate. A cover frame is often installed on the side walls of the cargo bed, and a soft-cover may be attached to the cover frame using buckles or Velcro® strips. However, due to its own weight and the external water and dirt that may accumulate on the top throughout time, the soft-cover, especially its middle section, could depress or collapse, which may significantly affect the lifespan of the soft-cover.

BRIEF DESCRIPTION OF THE DRAWINGS

The foregoing and other features of the present disclosure will become more fully apparent from the following description and appended claims, taken in conjunction with the accompanying drawings. These drawings depict only several embodiments in accordance with the disclosure and are, therefore, not to be considered limiting of its scope. The disclosure will be described with additional specificity and detail through use of the accompanying drawings.

DETAILED DESCRIPTION

Figure 1:
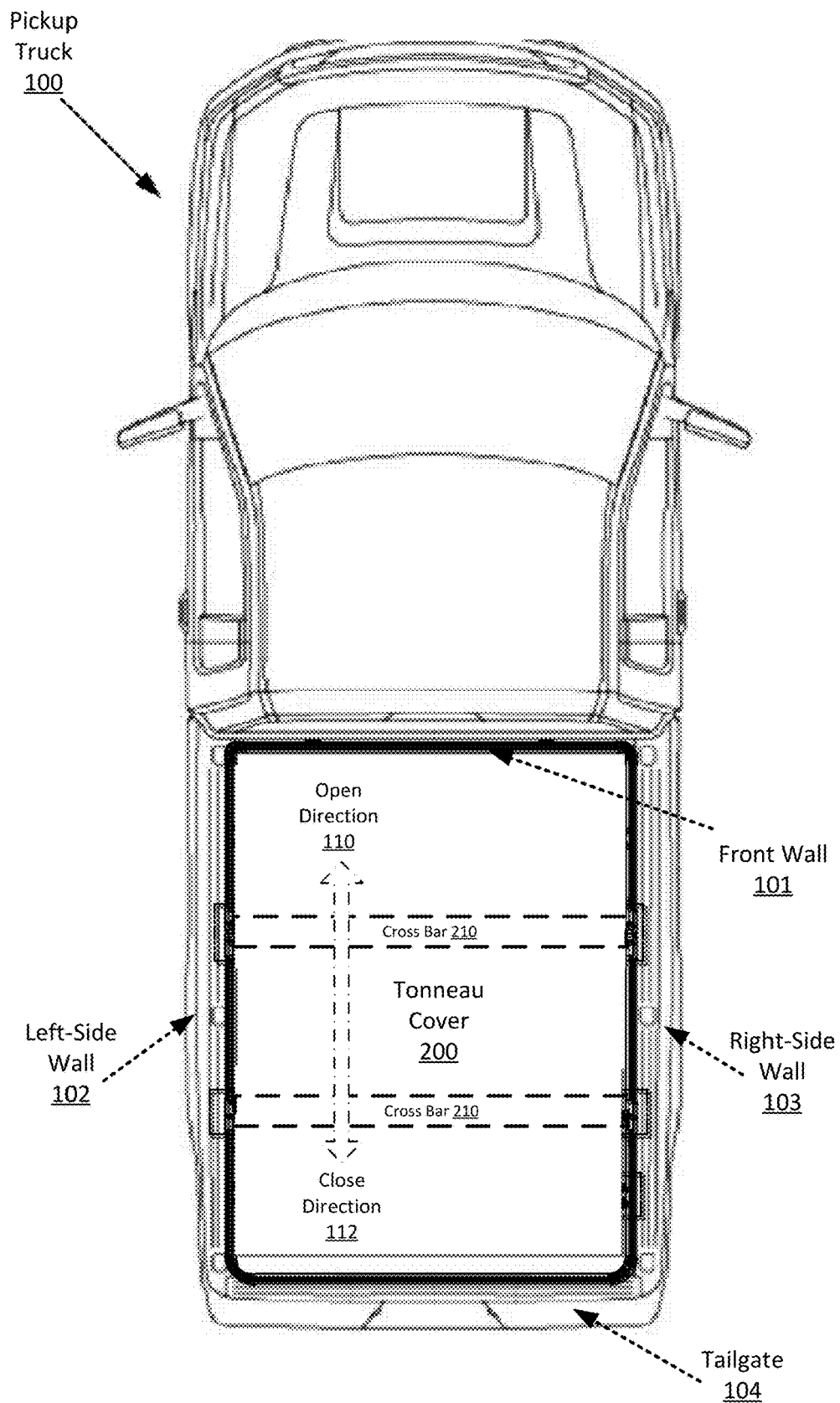
FIG. 1 illustrates a tonneau cover for a pickup truck.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

FIG. 1 illustrates a tonneau cover for a pickup truck, according of certain embodiments of the present disclosure. In FIG. 1, a tonneau cover 200 may be used to cover the cargo bed of a pickup truck 100. The pickup truck 100 may be any vehicle having an opened/exposed cargo bed in its back. The cargo bed may include a front wall 101, a left-side wall 102, a right-side wall 103, as well as a tailgate (or back wall) 104. The left-side wall 102, the right-side wall 103, and/or the tailgate 104 may be individually and selectively opened or closed. The front wall 101, the left-side wall 102, the right-side wall 103, and tailgate 104 may be constructed using metal sheets rolled or connected together, forming long, narrow, and relatively flat surfaces on the top of these walls. The tonneau cover 200 may be placed on, attached to, or supported by, the top flat surfaces of these walls, and may protect the inner space of the pickup truck 100's cargo bed from adverse weather, potential theft, or cargo-dislodging when the pickup truck 100 is stationary or in motion. The tonneau cover 200 may also be used to cover the interior space of any transportation device, whether powered or not, to cover any opened compartment; or to cover any physical structure having an opening compartment.

In some embodiments, the tonneau cover 200 may be a soft cover made of materials such as fabric, canvas, plastic, and/or vinyl. To install the tonneau cover 200 onto the cargo bed, a frame structure (not shown in FIG. 1) may be secured to the top flat surfaces of the walls 101, 102, 103, and/or 104. The edges of the tonneau cover 200 may be equipped with various types of fasteners such as snaps, hooks, or Velcro® strips, and may be attached to the frame structure using these fasteners. One edge of the tonneau cover 200 may be more permanently attached to a section of the frame structure on the top of the front wall 101, and the other three edges of the tonneau cover 200 may be temporarily attached/detached to/from the sections of the frame structures on the top of the side walls 102, 103, and 104. To close the tonneau cover 200, a person may lay the tonneau cover 200 across the whole cargo bed, and attach the edges of the tonneau cover 200 to the respective sections of the frame structure. To open the tonneau cover 2200, the person may detach the edge of the tonneau cover 200 at or near the tailgate 104, and roll the tonneau cover 200 toward the front wall 101 to gradually expose the interior of the cargo bed.

In some embodiments, to prevent the middle section or center area of a closed tonneau cover 200 from sagging or collapsing, one or more cross bars 210 may be placed along the inner side of the tonneau cover 200 to support the middle section or center area of the tonneau cover 200. For illustrative purposes, the cross bars 210 in FIG. 1 are shown using dotted lines, indicating that these cross bars 210 are invisible from the outside when the tonneau cover 200 is in a closed position. In some embodiments, the cross bars 210 may not be attached to the inner side of the tonneau cover 200. In this case, the closed tonneau cover 200 may be resting on top of the cross bars 210. In another situation, the inner side of the tonneau cover 200 may include multiple cloth or metal loops. The cross bars 210 may then be inserted through these loops for loosely securing the cross bars 210 on the inner side of the tonneau cover 200. Further, the cross bars 210 may be tightly secured onto the inner side of the soft cover 200. A tightly secured cross bar 210 may prevent it from rotating, moving, or falling off from the tonneau cover 200. Multiple cross bars 210 may be fitted to various positions underneath the tonneau cover 200, in order to allow the cross bars 210 to provide supports to different sections of the tonneau cover 200.

In some embodiments, the tonneau cover 200 may be rolled-open or rolled-close in the open direction 110 or the close direction 112. Specifically, when the tonneau cover 200 is in a closed position, meaning the tonneau cover 200 covers all of the cargo bed, a user may open the tonneau cover 200 by starting from the tailgate edge of the tonneau cover 200, and then opening and rolling the tailgate edge toward the open direction 110. The rolled-up portion of the tonneau cover 200 may expose the portion of the cargo bed previously hidden. When the tonneau cover 200 rolls pass a cross bar 210, the rolled-up portion of the tonneau cover 200 may contain the cross bar 210, meaning the cross bar 210 may be rolled into the rolled-up portion of the tonneau cover 200. Due to the rigid cross bar 210 contained therein, the rolled-up portion of the tonneau cover 200 may be supported by the left-side wall 102 and the right-side wall 103 (via frames that are not shown in FIG. 1). Thus, the rigid cross bar 210 may be able to support the tonneau cover 200 even when it is in an opened or partial-opened position. Similarly, to close the tonneau cover 200, the user may roll down and flat out the rolled-up portion of the tonneau cover 200 toward the close direction 112.

In some embodiments, the tonneau cover 200 may be slide-open or slide-close in the open direction 110 or the close direction 112. Specifically, when the tonneau cover 200 is in a closed position, a user may open the tonneau cover 200 by starting from the tailgate edge of the tonneau cover 200, and then push the tailgate edge toward the open direction 110. When the tonneau cover 200 pushing reaches a cross bar 210, the cross bar 210 may slide along the side frames that are placed above the left-side wall 102 and right-side wall 103, meaning the cross bar 210 may be moving/sliding horizontally toward the open direction 110 along with the tonneau cover 200. A portion of the tonneau cover 200 may be supported by the left-side wall 102 and the right-side wall 103, without falling into the cargo bed.

For clarification purposes, once the tonneau cover 200 is installed onto the pickup truck's cargo bed, the side of tonneau cover 200 designed to face inside/interior of the cargo bed (or face down when installed and closed on the cargo bed) may be referred to as the "inner" side of the tonneau cover 200, and the other side of the tonneau cover 200 designed to face outside/exterior of the cargo bed (or face up when installed and closed on the cargo bed) may be referred to as the "outer" side of the tonneau cover 200. Further, various hinges, clamps, and/or supporting cross bars (none are shown in FIG. 1) may be located on the inner side of the tonneau cover 200, and may be hidden from external views when the tonneau cover 200 covers the cargo bed.

Figure 2:
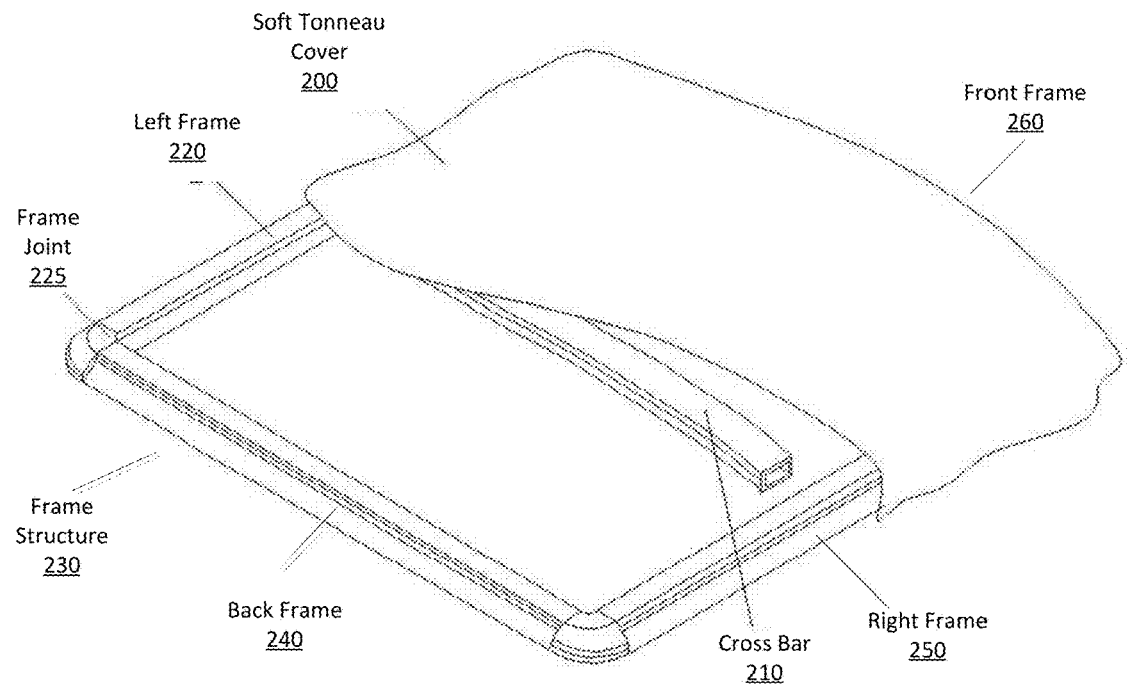
FIG. 2 illustrates a soft tonneau cover partially covering the cargo bed of a pickup truck.

FIG. 2 illustrates a soft tonneau cover partially covering the cargo bed of a pickup truck, according of certain embodiments of the present disclosure. In FIG. 2, the tonneau cover 200 may be fitted with one or more supporting cross bars 210. The supporting cross bar 210 may be made of rigid material (e.g., metal, hard plastic) that can support the soft tonneau cover 200 when the tonneau cover 200 covers the cargo bed. In other words, when the tonneau cover 200 is in a closed or semi-closed position, the cross bar 210 may prevent the tonneau cover 200 from sagging down, thereby reducing/eliminating the water and dirt accumulating on the top of the tonneau cover 200.

In some embodiments, the cross bar 210 may not be attached onto the inner side of the soft tonneau cover 200. In other words, when the tonneau cover 200 is opened, it can be separated from the cross bar 210, as illustrated in FIG. 2. Alternatively, the cross bar 210 may be attached onto the inner side of the soft tonneau cover 200 using various fixation means. For example, the cross bar 210 may be glued onto the inner surface of the tonneau cover 200. The cross bar 210 may also be tied or sewed onto the inner surface of the tonneau cover 200 using stings, wires, fabrics, belts, and other attaching means. When the tonneau cover 200 is in a closed position, the cross bars 210, which is underneath the tonneau cover 200, may be hidden and invisible from the outside. A cross bar 210 that is glued onto the inner surface of the tonneau cover 200 may provide a better aesthetic appearance, as the outer surface of the tonneau cover 200 may be flat without showing any stitches.

In some embodiments, the cargo bed of the pickup truck may be equipped with a frame structure 230. Specifically, the frame structure 230 may have four frames for attaching to the four side-walls of the cargo bed, and four frame joints for connecting the four frames. The four frames may include the left frame 220, the back frame 240, the right frame 250, and a front frame 260 (hidden beneath the tonneau cover 200 in FIG. 2), for being supported by the left-side wall, the tailgate, the right-side wall, and the front wall of the cargo bed, respectively. A frame joint 225 may be used to joint/connect two adjacent frames. For example, the frame joint 225 may be used to connect the left frame 220 and the back frame 240. And various kinds of attachment tools (e.g., clamps, screws, glues, etc.) may be used to attach the frame structure 230 onto the four walls of the cargo bed.

In some embodiments, the cross bar 210 may be long enough to have its two ends placed on the frame structure 230. When the tonneau cover 200 is in a closed position, the two ends of the cross bar 210 may be in-contact with the left frame 220 and the right frame 250, thereby allowing the cross bar 210 to support the middle section of the tonneau cover 200 from sagging down. In other embodiments, the cross bar 210 may have a hollow center, which allows bar-frame connectors to be inserted into both of its ends. The cross bar 210 attached with bar-frame connectors may have sufficient length to be in contact with the left and right frames for weight support.

In some embodiments, the cross bar 210 may be curved upward (toward the outer space of the cargo bed). The curved cross bar 210 may allow certain weight to be placed on the top of the tonneau bar 210. For example, for lumbers that are too long to fit inside of the cargo bed, a user may place/tie the lumbers on the top of the closed tonneau bar 210, thereby allowing the cross bar 210 to handle the weight of the lumbers. Alternatively, the cross bar 210 may be made of material having certain elasticity. For example, the cross bar 210 may be made of hard rubber or elastic steel, which enables the cross bar 210 to bend toward one direction or another. In this way, when there are too many goods placed inside resulting overflowing above the cargo bed, the elastic cross bar 210 may allow certain leeway and flexibility to close the tonneau cover 200 without breaking the tonneau cover 200 or the cross bar 210.

Figure 3:
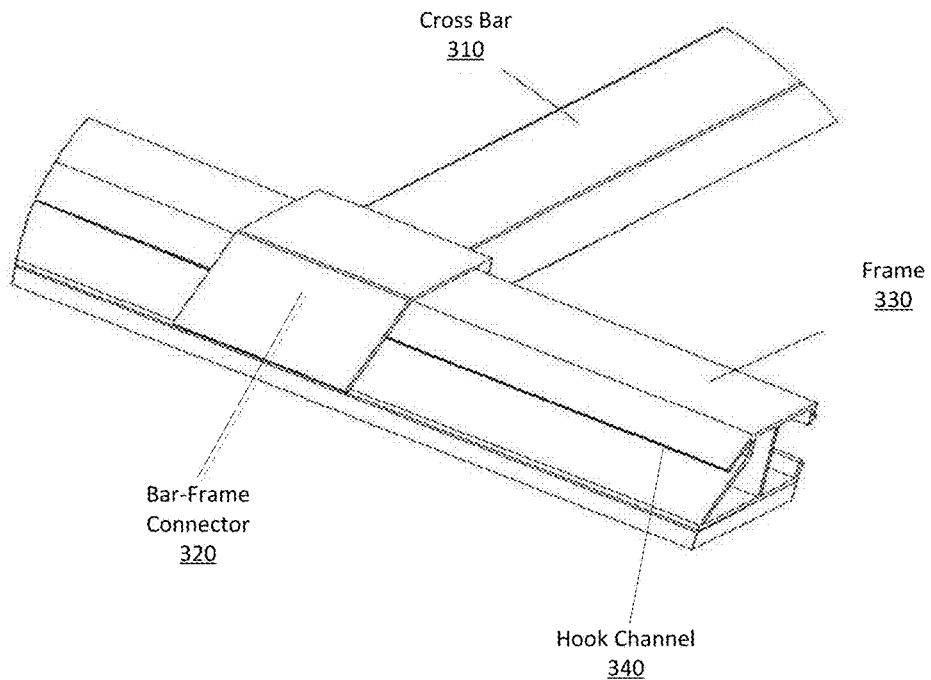
FIG. 3 illustrates a cross bar having one of its ends equipped with a bar-frame connector for placing upon a frame.

FIG. 3 shows a cross bar having one of its ends equipped with a bar-frame connector for placing upon a frame, according of certain embodiments of the present disclosure. For clarification purposes, the tonneau cover with which the cross bar 310 is fitted is not shown in FIG. 3. Specifically, each end of the cross bar 310 may be equipped with a corresponding bar-frame connector 320. When the tonneau cover is in a closed/semi-closed position, the bar-frame connector 320 may be placed on the top of the frame 330 (e.g., a left frame or a right frame), thereby allowing the cross bar 310 to be supported by the frame 330 via the bar-frame connector 320.

In some embodiments, the bar-frame connector 320 may be constructed using a thin but firm material (e.g., metal or hard plastic). The shape of the bar-frame connector 320 may correspond to the outer/upper external shape of the frame 330, so that the contacting area between the bar-frame connector 320 and the frame 330 may become substantially seamless. Such an arrangement may also allow the bar-frame connector 320 to slide horizontally along the longitude of the frame 300.

In some embodiments, the weight of the cross bar 310 (plus the weight of the tonneau cover that is supported by the cross bar) may be transferred to the frame 330 via the bar-frame connector 320. In this case, the bar-frame connector 320 may be a rigid structure that can preserve its shape under certain amount of weight. Alternatively, the frame 330 may have a supporting edge that allows the cross bar 310 to be directly placed upon. In this case, the weight of the cross bar 310 may be directly supported by this supporting edge, and the bar-frame connector 320 may be constructed using a relatively soft material to prevent side movement and prevent the cross bar 310 from hitting the frame 330 during vehicle movement.

In some embodiments, the bar-frame connector 320 may be attached to or detached from the cross bar 310 freely. Specifically, two bar-frame connectors 320 may be physically attached to two opposite edges of the tonneau cover, while the cross bar 310 is not attached to the tonneau cover. In this way, when a user wants the tonneau cover to have cross-bar support, he can insert the two bar-frame connectors 320 into two ends of the cross bar 310, thereby allowing the cross bar 310 to gain support via the left frame and right frame. When the user does not want cross bar support, he can detach the cross bar 310 from the two bar-frame connectors 320, and the cross bar 310 can be separated from the tonneau cover.

In some embodiments, the frame 330 may be equipped with a hook channel 340 that is positioned on the outer side of the frame 330. The hook channel 340 may be a long and deep edge positioned along the longitude of the frame 330. Multiple hooks (or a hook strip) connected to the edges of the tonneau cover may be inserted into the hook channel 340 to secure the tonneau cover onto the frame 330.

Figure 4A:
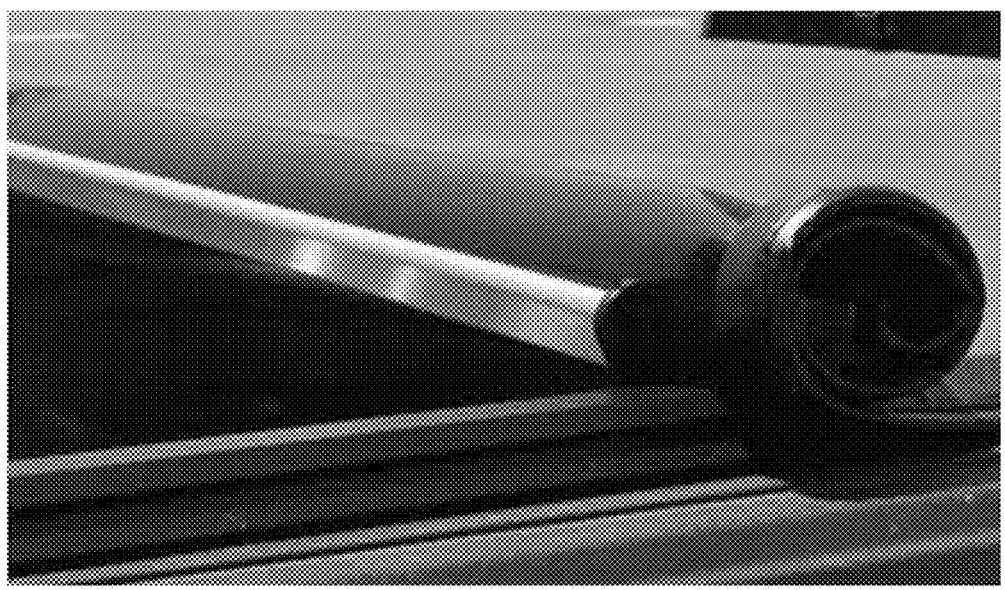
FIG. 4A-4D illustrate a tonneau cover equipped with a cross bar in various opened/semi-opened positions.

FIGS. 4A-4D show a tonneau cover equipped with a cross bar in various opened/semi-opened positions, according to certain embodiments of the present disclosure. In FIG. 4A, the tonneau cover is rolled up into a semi-opened/semi-closed position. Specifically, the tonneau cover is rolled up to a position that the cross bar that is fitted to the inner side of the tonneau cover is exposed. In addition, the cross bar is equipped with bar-frame connectors which allow the cross bar to be rested on the left frame and the right frame.

Figure 4B:

In FIG. 4B, the tonneau cover is further rolled up to show one end of the cross bar attached with a bar-frame connector. In this case, the cross bar may provide a structure support to the rolled-up portion of the soft tonneau cover, thereby allowing the rolled-up portion of the tonneau cover to stay above the cargo bed and preventing any portion of the tonneau cover from falling into the cargo bed. Further, a fastening tool (e.g., clamp, button, magnet, Velcro® strip, etc. not shown in FIG. 4B) may secure the partially rolled-up tonneau cover to this exact location, so that when the pickup truck is moving, the tonneau cover can stay at the same partial-opened/partial-closed position.

Figure 4C:
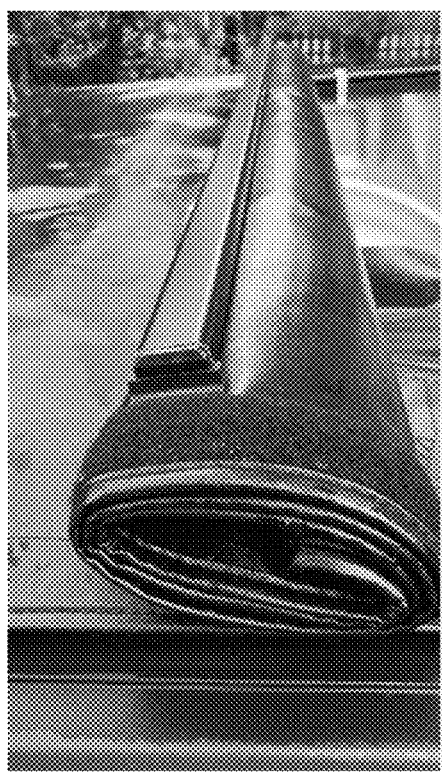

In some embodiments, as shown in FIG. 4C, a cross bar may be equipped with two bar-frame connectors each of which may be secured under a Velcro® strip sewed/glued to the side-edge of the soft tonneau cover. In this situation, opposite Velcro® strips may be glued/secured to the side frames on the cargo bed. To close, the tonneau cover may be laid above the cargo bed, allowing the two Velcro strips on the edge of the tonneau cover and the side frame to contact with each other. Further, Velcro strip allows the tonneau cover to be secured at this partial-opened/partial-closed position when the pickup truck is moving.

Figure 4D:
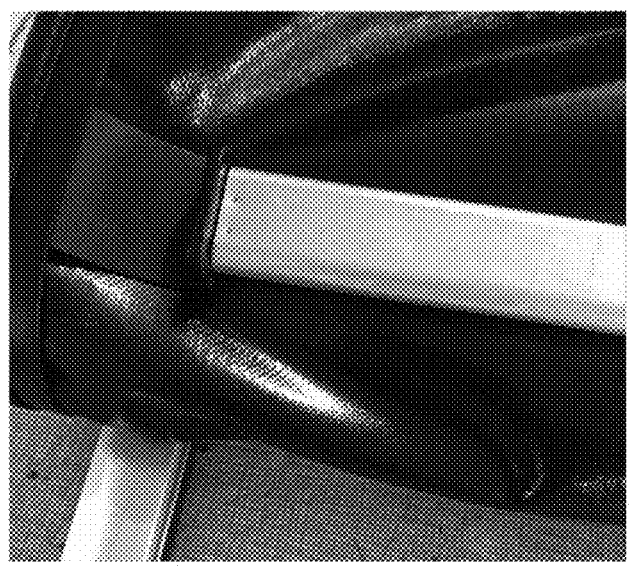

In some embodiments, as shown in FIG. 4D, a cross bar may be equipped with two soft bar-frame connectors each of which may be sewed onto the inner edge of the tonneau cover. The weight of the tonneau cover may be supported by the cross-bar, which itself may be placed directly onto the supporting edges of the frame structure. In other words, the soft bar-frame connector may not be used for directly supporting the weight of the tonneau cover. Instead, the supporting edges of the frame structure may provide direct supports to the cross bar.

Figure 5:
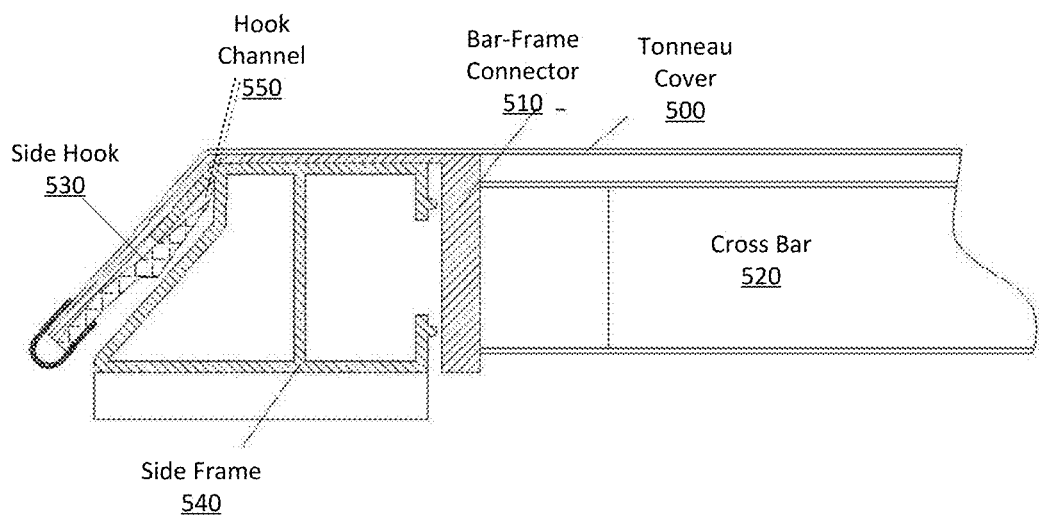
FIG. 5 illustrates a partial cross-sectional view of a tonneau cover equipped with a cross bar and attached to a side frame via a side hook.

FIG. 5 illustrates a partial cross-sectional view of a tonneau cover equipped with a cross bar and attached to a side frame via a side hook, according to certain embodiments of the present disclosure. In FIG. 5, the tonneau cover 500 may have a cross bar 520 fitted on its inner side. One end of the cross bar 520 may be inserted with a bar-frame connection 510 for placing on the top of a side frame 540. Each side edge of the tonneau cover 500 may be furnished with a side hook 530, which may be a long and narrow strip of plastic/metal panel. The side frame 540 may include a long and narrow hook channel 550 on one of its sides (the side that facing up and out). The hook channel 550 may allow the side hook 530 to be inserted, thereby securing the tonneau cover 500 to the side frame 540.

In some embodiments, the bar-frame connector 510 may be made of hard material, so that the connection between the bar-frame connector 510 and the cross bar 520 is rigid. When in contact with the top side of the side frame 540, the bar-frame connector 510 may be able to transfer the weight of the cross bar 520 and the weight of the tonneau cover 500 to the side frame 540.

In some embodiments, the side hook 530 may be sewed/glued/stitched/clamped onto the side edge of the tonneau cover 500. To insert the side hook 530 into the hook channel 550, a user may pull the edge of the tonneau cover 500, so that the edge can extend over the side frame 540 and the tip of the side hook 530 can be inserted into the hook channel 550. Once the hook 530 is into the hook channel 550, the user can release the edge to allow the tonneau cover 500 to shrink/pull back a little. The pulling back of the tonneau cover 500 may ensure that the side hook 530 is further into the hook channel 550, thereby securing the tonneau cover 500 onto the side frame 540.

Figure 6:
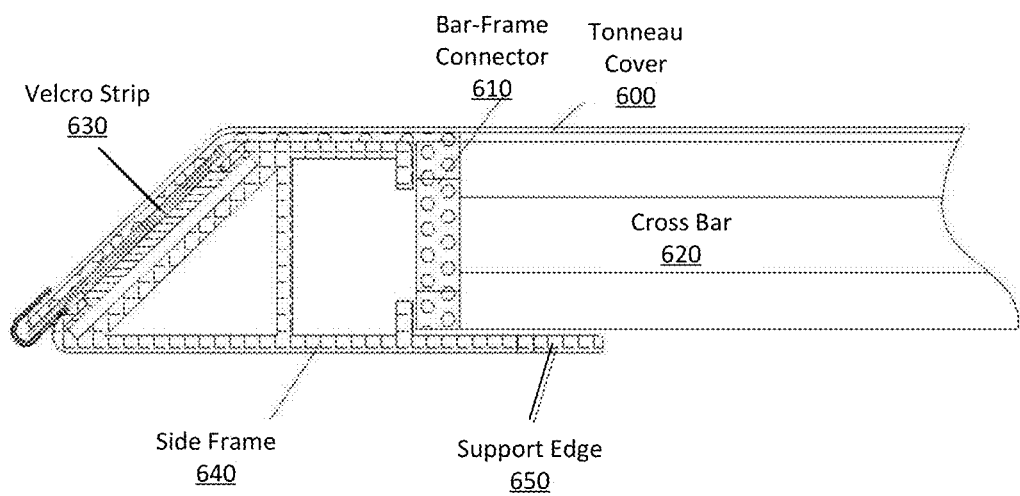
FIG. 6 illustrates a partial cross-sectional view of a tonneau cover equipped with a cross bar and attached to a side frame via a Velcro strip.

FIG. 6 illustrates a partial cross-sectional view of a tonneau cover equipped with a cross bar and attached to a side frame via a Velcro strip, according to certain embodiments of the present disclosure. In FIG. 6, the tonneau cover 600 may have a cross bar 620 fitted on its inner side. One end of the cross bar 620 may be equipped with a bar-frame connection 610 for placing on the top of a side frame 640. Each side edge of the tonneau cover 600 may be equipped with an attachment strip, which may be a long and narrow strip of Velcro tape. The side frame 640 may also include a long and narrow attachment strip (e.g., Velcro strip) on one of its sides. The attachment strips on the tonneau cover 600 and the side frame 640 may be attached together, thereby allowing the tonneau cover 600 to be tightly closed.

In some embodiments, the bar-frame connector 610 may be made of soft materials such as plastic or rubber, so that even though the connection between the bar-frame connector 510 and the cross bar 520 is rigid, the portion of the bar-frame connector 610 that is in contact with the top of the side frame 640 may be soft and unable to support weight. In this case, the side frame 640 may have a support edge 650 that extends into the cargo bed space, and can support the bottom of cross bar 620. The support edge 650 may allow the weight of the cross bar 520 and the weight of the tonneau cover 500 to be transferred to the side frame 540.

Figure 7:
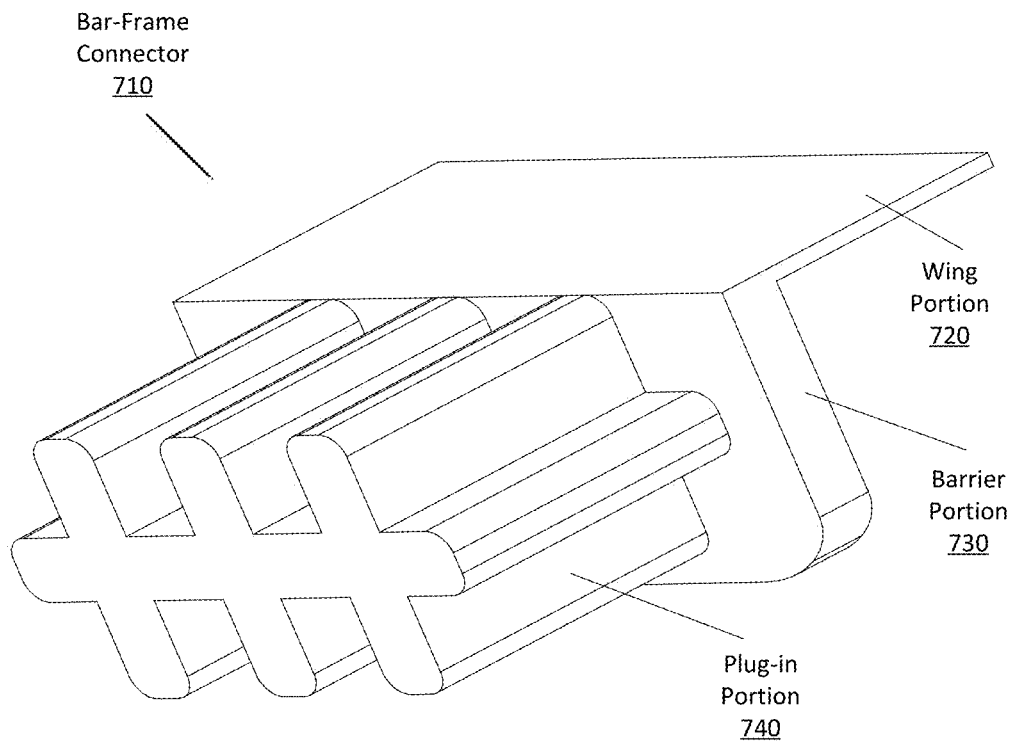
FIG. 7 illustrates perspective view of a bar-frame connector, all according to certain embodiments of the present disclosure.

FIG. 7 illustrates perspective view of a bar-frame connector, according to certain embodiments of the present disclosure. Specifically, FIG. 7 shows a bar-frame connector 710 having a wing portion 720, a barrier portion 730, and a plug-in portion 740. When the bar-frame connector 710 is made of hard material, the wing portion 720 may be placed above the frame for supporting the weight of the cross bar. When the bar-frame connector 710 is made of soft material (e.g., plastic or rubber), the wing portion 720 is designed to allowing easy sewing onto the soft tonneau cover.

In some embodiments, the cross bar may have a hollow tube shape, and the bar-frame connector 710 may be inserted into the open end of the cross bar via the plug-in portion 740. Specifically, the plug-in portion 740 may be made of flexible material such as rubber and plastic, and may have a "+++" shape to increase the flexibility in plugging-in or pulling-out the bar-frame connector 710 to/from the cross bar. Alternatively, the plug-in portion 740 may have any other shapes that can provide friction in hold the bar-frame connector 710 onto the cross bar, and allow easy removability. The barrier portion 730 may prevent the bar-frame connector 710 from inserted too much into the cross bar. Also, once the bar-frame connector 710 is inserted, the barrier portion 730 may seal the open end of the cross bar, and prevent water and dirt from entering into the hollow interior of the cross bar.

Thus, multiple embodiments of a tonneau cover for pickup truck's cargo bed have been described. Although the present disclosure has been described with reference to specific exemplary embodiments, it will be recognized that the disclosure is not limited to the embodiments described, but can be practiced with modification and alteration within the spirit and scope of the appended claims. Accordingly, the specification and drawings are to be regarded in an illustrative sense rather than a restrictive sense.

One skilled in the art will appreciate that, for this and other apparatuses and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments. Moreover, one or more of the outlined steps and operations may be performed in parallel.

What is claimed is:

1. A tonneau cover for covering a pickup truck bed, comprising:
    a frame structure for attaching to walls of the pickup truck bed;
    a soft cover for covering the pickup truck bed, wherein the soft cover has edges that can be attached to the frame structure; and
    a cross bar attached to an inner side of the soft cover, wherein when the soft cover is in a closed position, two ends of the cross bar are supported by the frame structure, and at least a portion of the soft cover is supported by the cross bar, wherein, when the soft cover is rolling up toward an opened position, the cross bar rolls with the soft cover, and a rolled-up portion of a weight of the soft cover is supported by the cross bar.

2. The tonneau cover as recited in claim 1, wherein the frame structure includes support edges, when the soft cover is in a closed position, two ends of the cross bar are supported by the support edges of the frame structure, and the soft cover's weight is transferred from the cross bar to the frame structure via the support edges.

3. The tonneau cover as recited in claim 1, wherein two ends of the cross bar are attached with two corresponding bar-frame connectors, when the soft cover is in a closed position, the two bar-frame connectors are in contact with the frame structure, and the soft cover's weight is transferred from the cross bar to the frame structure via the bar-frame connectors.

4. The tonneau cover as recited in claim 3, wherein each of the bar-frame connectors has a plug-in portion to be inserted into or pulled out of one end of the cross bar.

5. The tonneau cover as recited in claim 1, wherein two edges of the soft cover are attached with two corresponding connecting strips, when the soft cover is in a closed position, the two connecting strips are attached to the frame structure.

6. The tonneau cover as recited in claim 5, wherein each of the connecting strips contains a side hook to be hooked into a corresponding side channel in the frame structure.

7. The tonneau cover as recited in claim 5, wherein:
    each of the connecting stripes is a tape to be attached with a corresponding tape on the frame structure.

8. A tonneau cover for covering a pickup truck bed, comprising:
    a left-frame and a right frame for attaching to a left-wall and a right-wall of the pickup truck bed;
    a soft cover for covering the pickup truck bed, wherein the soft cover has a left edge to be attached to the left-frame and a right edge to be attached to the right frame; and
    one or more rigid cross bars attached to an inner side of the soft cover, wherein when the soft cover is in a closed position, each of the cross bars is in contact with the left-frame and the right-frame, and at least a portion of the soft cover is supported by the cross bars; wherein, when the soft cover is rolling up toward an opened position, a first cross bar selected from the cross bars rolls with the soft cover causing a rolled-up section of the soft cover to contain the first cross bar such that the rolled-up section of a weight of the soft cover is supported by the first cross bar.

9. The tonneau cover as recited in claim 8, wherein
the left-frame includes a first support edge, the right-frame includes a second support edge, when the soft cover is in a closed position, two ends of the cross bars are supported by the first support edge and the second support edge, and the soft cover's weight is transferred from the cross bar to the frame structure via the first support edge and the second support edge.

10. The tonneau cover as recited in claim 8, wherein
when the soft cover is pushing toward an opened position causing a cross bar selected from the cross bars to slide on the left-frame and the right-frame, and opened-up section of the soft cover's weight is supported by the cross bar selected from the cross bars.

11. The tonneau cover as recited in claim 8, wherein
for a rigid cross bar selected from the rigid cross bars, two ends of the cross bar are attached with two corresponding bar-frame connectors, when the soft cover is in a closed position, the two bar-frame connectors are respectively in contact with the left-frame and the right-frame, and the portion of the soft cover's weight is transferred from the cross bar selected from the rigid cross bars to the left-frame and the right-frame via the two bar-frame connectors.

12. The tonneau cover as recited in claim 11, wherein
each of the bar-frame connectors has on one end a plug-in portion to be inserted into the cross bar, and on its other end a wing-portion to be in contact with the left-frame or the right-frame.

13. The tonneau cover as recited in claim 8, wherein
two sides of the soft cover are attached with two corresponding connecting strips, when the soft cover is in a closed position, the two connecting strips are attached with the frame structure.

14. The tonneau cover as recited in claim 13, wherein
each of the connecting strips contains a side hook to be hooked into a corresponding hook channel in the frame structure.

15. The tonneau cover as recited in claim 13, wherein
each of the connecting stripes is a tape to be attached with a corresponding tape on the frame structure.

16. A tonneau cover for covering a pickup truck bed, comprising:
a frame-structure including a left-frame, a right-frame, a front-frame and a back-frame, wherein the left-frame, the right-frame, the front-frame and the back-frame are attached to a left-side wall, a right-side wall, a front wall, and a tailgate of the pickup truck bed, respectively;
a soft cover for covering the pickup truck bed, wherein the soft cover has a front-edge to be attached to the front-frame, a left-edge to be attached to the left-frame, a right-edge to be attached to the right-frame, and a back-edge to be attached to the back-frame; and
one or more cross bars attached to an inner side of the soft cover, wherein
when the soft cover is in a closed position, each of the cross bars is in contact with the left-frame and the right-frame, and the soft cover is partially supported by the cross bars, and
when the soft cover is in a partial opened position with a portion of the soft cover rolled up with a cross bar, the portion of a weight of the soft cover is supported by the cross bar.

17. The tonneau cover as recited in claim 16, wherein
the soft cover is opened or closed by rolling an edge of the soft cover.

18. The tonneau cover as recited in claim 16, wherein
the soft cover is opened or closed by pushing an edge of the soft cover.

19. The tonneau cover as recited in claim 1, wherein the cross bar is made of at least one of hard rubber or elastic steel which enables the cross bar to bend toward one direction or another.

20. The tonneau cover as recited in claim 8, wherein the first cross bar is made of at least one of hard rubber or elastic steel which enables the first cross bar to bend toward one direction or another.

21. The tonneau cover as recited in claim 1, wherein the cross bar is equipped with two soft bar-frame connectors such that each of the two soft bar-frame connectors is sewed onto an inner edge of the tonneau cover.

22. The tonneau cover as recited in claim 1, wherein the cross bar is equipped with a bed-frame connector made of a soft material wherein the bed-frame connector further comprises a wing portion, a barrier portion, and a plug-in portion such that the wing portion is sewed onto the tonneau cover.

* * * * *

UNITED STATES PATENT AND TRADEMARK OFFICE
CERTIFICATE OF CORRECTION

| | | |
|---|---|---|
| PATENT NO. | : 11,427,059 B2 | Page 1 of 1 |
| APPLICATION NO. | : 16/371512 | |
| DATED | : August 30, 2022 | |
| INVENTOR(S) | : Hang Shi and Hongjuan Zheng | |

It is certified that error appears in the above-identified patent and that said Letters Patent is hereby corrected as shown below:

On the Title Page

Item (73) Assignees should read Hang Shi, Changzhou (CN); Hongjuan Zheng, Changzhou (CN)

Signed and Sealed this
Thirty-first Day of January, 2023

Katherine Kelly Vidal
*Director of the United States Patent and Trademark Office*